(12) United States Patent
Zoran et al.

(10) Patent No.: US 10,830,117 B2
(45) Date of Patent: Nov. 10, 2020

(54) COMPACT SIDE INLET AND OUTLET EXHAUST AFTERTREATMENT SYSTEM

(71) Applicant: Cummins Emission Solutions, Inc., Columbus, IN (US)

(72) Inventors: Randolph G. Zoran, McFarland, WI (US); David M. Sarcona, Oregon, WI (US); Ryan M. Johnson, Cottage Grove, WI (US); Enoch Nanduru, Pune (IN)

(73) Assignee: Cummins Emission Solutions Inc., Columbus, IN (US)

( * ) Notice: Subject to any disclaimer, the term of this patent is extended or adjusted under 35 U.S.C. 154(b) by 191 days.

(21) Appl. No.: 15/539,010

(22) PCT Filed: Dec. 22, 2015

(86) PCT No.: PCT/US2015/067317
§ 371 (c)(1),
(2) Date: Jun. 22, 2017

(87) PCT Pub. No.: WO2016/109321
PCT Pub. Date: Jul. 7, 2016

(65) Prior Publication Data
US 2017/0370262 A1  Dec. 28, 2017

Related U.S. Application Data

(60) Provisional application No. 62/098,661, filed on Dec. 31, 2014.

(51) Int. Cl.
*F01N 3/10* (2006.01)
*F01N 3/20* (2006.01)
(Continued)

(52) U.S. Cl.
CPC ........... *F01N 3/2066* (2013.01); *F01N 3/021* (2013.01); *F01N 3/103* (2013.01); *F01N 3/106* (2013.01);
(Continued)

(58) Field of Classification Search
CPC ........ F01N 13/009; F01N 3/021; F01N 3/103; F01N 3/106; F01N 3/2066; F01N 3/2892; F01N 2240/20; F01N 2610/02
See application file for complete search history.

(56) References Cited

U.S. PATENT DOCUMENTS 4,673,423 A 6/1987 Yumlu
4,881,959 A * 11/1989 Kono ..................... F01N 3/027
55/282.3
(Continued)

FOREIGN PATENT DOCUMENTS

CN 2537449 Y 2/2003
CN 102527231 7/2012
(Continued)

OTHER PUBLICATIONS

Office Action issued for U.S. Appl. No. 15/539,954, dated Sep. 7, 2018, 15 pages.
(Continued)

*Primary Examiner* — Matthew T Largi
(74) *Attorney, Agent, or Firm* — Foley & Lardner LLP

(57) ABSTRACT

An exhaust aftertreatment assembly and method of manufacturing and operating an exhaust aftertreatment assembly. An exhaust aftertreatment assembly includes an aftertreatment housing and an inlet conduit coupled to the aftertreatment housing at an inlet port so as to transfer exhaust gas into the aftertreatment housing. An inlet chamber is positioned in the aftertreatment housing. The inlet chamber is
(Continued)

fluidly coupled to the inlet port of the aftertreatment housing to receive the exhaust gas from the inlet conduit.

23 Claims, 11 Drawing Sheets

(51) Int. Cl.
  *F01N 3/021*   (2006.01)
  *F01N 13/00*   (2010.01)
  *F01N 3/28*   (2006.01)

(52) U.S. Cl.
  CPC ......... *F01N 3/2892* (2013.01); *F01N 13/009* (2014.06); *F01N 2240/20* (2013.01); *F01N 2610/02* (2013.01); *Y02A 50/2325* (2018.01); *Y02T 10/24* (2013.01)

(56) References Cited

U.S. PATENT DOCUMENTS

| | | | |
|---|---|---|---|
| 5,043,146 A * | 8/1991 | Ishikawa | F01N 3/2892 422/176 |
| D320,837 S | 10/1991 | Loefke et al. | |
| 5,137,656 A | 8/1992 | Conner | |
| 5,224,621 A | 7/1993 | Cannan et al. | |
| 5,597,948 A | 1/1997 | Sharp | |
| 5,611,832 A | 3/1997 | Suzuki et al. | |
| 5,869,010 A | 2/1999 | Langer | |
| 6,475,944 B1 | 11/2002 | Yang et al. | |
| D590,419 S | 4/2009 | Duffek et al. | |
| D607,536 S | 1/2010 | Filo | |
| 8,091,353 B2 * | 1/2012 | Nakahira | F01N 3/025 60/286 |
| 8,341,949 B2 | 1/2013 | Tarabulski | |
| 8,359,848 B2 * | 1/2013 | Bruza | F01N 3/2892 422/169 |
| 8,540,793 B2 * | 9/2013 | Kasaoka | F01N 13/1844 422/169 |
| 8,609,047 B2 | 12/2013 | Dotzel et al. | |
| D702,735 S | 4/2014 | Sandou et al. | |
| 8,756,913 B2 | 6/2014 | Liu et al. | |
| D757,919 S | 5/2016 | Kimura | |
| D794,100 S | 8/2017 | McDonald et al. | |
| 9,745,883 B2 * | 8/2017 | Quadri | F01N 13/0097 |
| D798,992 S | 10/2017 | Rowsey | |
| D809,577 S | 2/2018 | McDonald et al. | |
| D819,778 S | 6/2018 | Polacek et al. | |
| 10,092,879 B2 | 10/2018 | Zoran et al. | |
| 2003/0221424 A1 | 12/2003 | Woerner et al. | |
| 2004/0159657 A1 | 8/2004 | Chism et al. | |
| 2006/0266022 A1 * | 11/2006 | Woerner | F01N 1/08 60/295 |
| 2007/0039316 A1 | 2/2007 | Bosanec et al. | |
| 2008/0060351 A1 | 3/2008 | Pawson et al. | |
| 2008/0297362 A1 | 12/2008 | Veenstra | |
| 2009/0044522 A1 | 2/2009 | Nakahira et al. | |
| 2009/0084094 A1 | 4/2009 | Goss et al. | |
| 2009/0136387 A1 | 5/2009 | Picton et al. | |
| 2009/0260351 A1 * | 10/2009 | Cremeens | F01N 3/005 60/310 |
| 2009/0313979 A1 * | 12/2009 | Kowada | B01D 53/9431 60/297 |
| 2010/0223916 A1 | 9/2010 | Hayashi et al. | |
| 2010/0242451 A1 | 9/2010 | Werni et al. | |
| 2010/0300082 A1 | 12/2010 | Zhang | |
| 2011/0023471 A1 * | 2/2011 | Werni | F01N 3/035 60/297 |
| 2011/0030351 A1 | 2/2011 | Kato | |
| 2011/0036063 A1 | 2/2011 | Kumar | |
| 2011/0047973 A1 | 3/2011 | Wilhelm et al. | |
| 2011/0052454 A1 | 3/2011 | Kato | |
| 2011/0088375 A1 * | 4/2011 | Suzuki | B01D 53/90 60/295 |
| 2011/0094206 A1 | 4/2011 | Liu et al. | |
| 2011/0099978 A1 * | 5/2011 | Davidson | F01N 3/2066 60/274 |
| 2011/0167775 A1 * | 7/2011 | Mitsuda | F01N 1/10 55/482 |
| 2011/0271660 A1 | 11/2011 | Gonze et al. | |
| 2011/0311928 A1 | 12/2011 | Zimmer et al. | |
| 2012/0004863 A1 | 1/2012 | Ardanese et al. | |
| 2012/0210697 A1 | 8/2012 | Garimella et al. | |
| 2013/0039817 A1 * | 2/2013 | Fukuda | F01N 3/035 422/170 |
| 2013/0086894 A1 * | 4/2013 | Wikaryasz | F01N 13/141 60/282 |
| 2013/0097978 A1 * | 4/2013 | Nagasaka | B01D 46/0043 55/332 |
| 2013/0125524 A1 | 5/2013 | Plummer et al. | |
| 2013/0213008 A1 | 8/2013 | Kumar et al. | |
| 2013/0213013 A1 | 8/2013 | Mitchell et al. | |
| 2013/0232958 A1 | 9/2013 | Ancimer et al. | |
| 2013/0270278 A1 | 10/2013 | Schneider et al. | |
| 2014/0007562 A1 | 1/2014 | Justin | |
| 2014/0208723 A1 | 7/2014 | Baig et al. | |
| 2014/0260202 A1 | 9/2014 | Bays et al. | |
| 2014/0262590 A1 | 9/2014 | Daborn et al. | |
| 2014/0363358 A1 | 12/2014 | Udd et al. | |
| 2014/0373721 A1 | 12/2014 | Sandou et al. | |
| 2015/0000389 A1 | 1/2015 | Runde et al. | |
| 2015/0113966 A1 * | 4/2015 | Kamasamudram | B01D 53/9431 60/301 |
| 2015/0128566 A1 | 5/2015 | Osumi | |
| 2015/0224870 A1 | 8/2015 | Shin et al. | |
| 2016/0069239 A1 | 3/2016 | Freeman et al. | |
| 2016/0076430 A1 | 3/2016 | Freeman et al. | |
| 2016/0115847 A1 | 4/2016 | Chapman et al. | |
| 2016/0245207 A1 | 8/2016 | Ball et al. | |
| 2016/0326931 A1 | 11/2016 | Freeman et al. | |
| 2016/0369940 A1 | 12/2016 | Patil et al. | |
| 2017/0036165 A1 | 2/2017 | Schmid et al. | |
| 2017/0043295 A1 | 2/2017 | Minezawa et al. | |
| 2017/0074146 A1 | 3/2017 | Maletic et al. | |
| 2017/0089248 A1 | 3/2017 | Evans | |
| 2017/0327273 A1 | 11/2017 | Lee et al. | |
| 2017/0370262 A1 | 12/2017 | Zoran et al. | |
| 2018/0290826 A1 | 10/2018 | Polacek et al. | |

FOREIGN PATENT DOCUMENTS

| | | |
|---|---|---|
| EM | 002840355-001 | 10/2015 |
| EM | 002840355-002 | 10/2015 |
| EM | 002840355-003 | 10/2015 |
| EM | 002840355-004 | 10/2015 |
| GB | 2 465 151 A | 5/2010 |
| JP | 2009-013927 A | 1/2009 |
| WO | WO-2011/118527 A1 | 9/2011 |
| WO | WO 2016/109320 | 7/2016 |
| WO | WO-2016/109320 | 7/2016 |
| WO | WO-2016/109321 | 7/2016 |
| WO | WO 2016/109323 | 7/2016 |

OTHER PUBLICATIONS

International Search Report and Written Opinion for PCT/US2015/067302, dated Mar. 11, 2016, 10 pages.
International Search Report and Written Opinion for PCT/US2015/067317, dated Apr. 22, 2016, 18 pages.
International Search Report and Written Opinion for PCT/US2015/067324, dated Feb. 23, 2016, 8 pages.
Examination report for Indian Patent App. No. 201747018126, dated Jan. 4, 2019, 9 pages.
Office Action for Chinese Patent App. No. 201580070306.7, dated Oct. 31, 2018, 15 pages (with translation).
Office Action on U.S. Appl. No. 16/124,555, dated Feb. 20, 2019, 11 pages.
Office Action cited for U.S. Appl. No. 15/539,886, dated Mar. 1, 2018, 14 pages.
Final Office Action issued in U.S. Appl. No. 16/124,555 dated Aug. 20, 2019, 14 pages.

(56) References Cited

OTHER PUBLICATIONS

Examination Report in U.K. Patent App. No. 1708391.6 dated Mar. 26, 2020, 2 pages.
Examination Report in U.K. Patent App. No. 1710437.3 dated Mar. 19, 2020, 3 pages.

* cited by examiner

COMPACT SIDE INLET AND OUTLET EXHAUST AFTERTREATMENT SYSTEM

CROSS REFERENCE TO RELATED APPLICATIONS

The present application is a National Stage of PCT Application No. PCT/US2015/067317, filed Dec. 22, 2015, which claims priority to and benefit of U.S. Provisional Patent Application No. 62/098,661, filed Dec. 31, 2014 and entitled "Compact Side Inlet and Outlet Exhaust Aftertreatment System." The contents of both applications are herein incorporated by reference in their entirety and for all purposes.

TECHNICAL FIELD

The present disclosure relates to exhaust aftertreatment systems.

BACKGROUND

Efforts to increase efficiency and improve environmental impacts of internal combustion engines of vehicles have led to providing such vehicles with systems that treat the exhaust stream produced by the internal combustion engines of such vehicles. Systems that treat the exhaust stream are generally known as exhaust aftertreatment systems. Exhaust aftertreatment systems may include a variety of components, such as filters and catalysts for reducing contaminants or targeted by-products in the exhaust. Some exhaust aftertreatment systems include an injector placed in the exhaust stream. The injector is placed in the exhaust stream of the aftertreatment system to deliver a reductant such as ammonia ($NH_3$) for NOx reduction.

Aftertreatment systems generally warrant installing a number of additional components on a vehicle such as catalyst, filters, a diesel exhaust fluid source and other related components. Accordingly, systems having low configuration flexibility and complex serviceability requirements present a number of challenges, particularly in connection with accommodating various vehicle types and achieving high treatment performance.

SUMMARY

Various embodiments disclosed herein provide exhaust aftertreatment assemblies and methods of manufacturing and operating exhaust aftertreatment assemblies.

In a first set of embodiments, an exhaust aftertreatment assembly comprises an aftertreatment housing including an inlet port and an outlet port. The aftertreatment housing is configured to house a plurality of exhaust aftertreatment components. The exhaust aftertreatment assembly includes an inlet conduit coupled to the aftertreatment housing at the inlet port so as to enable transferring exhaust gas into the aftertreatment housing. An inlet chamber is positioned in the aftertreatment housing. The inlet chamber is fluidly coupled to the inlet port of the aftertreatment housing so as to receive the exhaust gas from the inlet conduit. A diesel oxidation catalyst is positioned in the aftertreatment housing. The diesel oxidation catalyst is fluidly coupled to the inlet chamber. The diesel oxidation catalyst has a smaller cross sectional area than the inlet chamber about a longitudinal flow axis. A particulate filter is positioned in the aftertreatment housing. The particulate filter is fluidly coupled to the diesel oxidation catalyst. A reductant injection chamber is positioned in the aftertreatment housing. The reductant injection chamber is fluidly coupled to the diesel oxidation catalyst. The reductant injection chamber includes a reductant port configured to receive a reductant injector. A selective catalytic reduction component is positioned in the aftertreatment housing. The selective catalytic reduction component is fluidly coupled to the reductant injection chamber. The selective catalytic reduction component is fluidly coupled to the outlet port in the aftertreatment housing.

In another set of embodiments, an aftertreatment system comprises an aftertreatment housing including an inlet port and an outlet port. The aftertreatment housing defines a longitudinal flow axis. The inlet port and the outlet port are oriented orthogonal to the longitudinal flow axis of the aftertreatment housing. An inlet chamber is coupled to the aftertreatment housing. The inlet chamber is fluidly coupled to the inlet port of the aftertreatment housing so as to receive and redirect an exhaust gas flow from the inlet port towards the aftertreatment housing along the longitudinal flow axis thereof. An outlet chamber is coupled to the aftertreatment housing. The outlet chamber is fluidly coupled to the outlet port of the aftertreatment housing so as to receive and redirect the exhaust gas flow from the aftertreatment housing in a direction orthogonal to the longitudinal flow axis of the aftertreatment housing towards the outlet port. A reductant injection chamber is positioned in the aftertreatment housing. The reductant injection chamber is fluidly coupled to the diesel oxidation catalyst. The reductant injection chamber includes a reductant port configured to receive a reductant injector. A selective catalytic reduction component is positioned in the aftertreatment housing downstream of the reductant injection chamber and fluidly coupled thereto. Furthermore, the selective catalytic reduction component is fluidly coupled to the outlet port of the aftertreatment housing.

In yet another set of embodiments, an aftertreatment housing assembly for housing a plurality of aftertreatment components comprising at least a selective catalytic reduction component, a diesel oxidation catalyst, and a particulate filter comprises an aftertreatment housing including an inlet port and an outlet port. The aftertreatment housing defines a longitudinal flow axis. The inlet port and the outlet port are oriented orthogonal to the longitudinal flow axis of the aftertreatment housing. An inlet chamber is coupled to the aftertreatment housing. The inlet chamber is fluidly coupled to the inlet port of the aftertreatment housing so as to receive and redirect an exhaust gas from the inlet port towards the aftertreatment housing along the longitudinal flow axis of the aftertreatment housing. An outlet chamber is coupled to the aftertreatment housing. The outlet chamber is fluidly coupled to the outlet port of the aftertreatment housing so as to receive and redirect the exhaust gas flow from the aftertreatment housing in a direction orthogonal to the longitudinal flow axis thereof towards the outlet port. A reductant injection chamber is positioned in the aftertreatment housing. The reductant injection chamber includes a reductant port configured to receive a reductant injector. A plurality of flow redirection fins are positioned in the inlet chamber. The plurality of flow redirection fins are structured to redirect an exhaust gas flow entering the inlet chamber via the inlet port in a substantially orthogonal direction towards the longitudinal flow axis of the aftertreatment housing. The diesel oxidation catalyst and the particulate filter are positionable downstream of the inlet chamber and upstream of the reductant injection chamber. Furthermore, the selective catalytic reduction component is positionable downstream of the reductant injection chamber and upstream of the outlet chamber.

In still another set of embodiments, a method of servicing an aftertreatment system which comprises an aftertreatment housing having a longitudinal flow axis, an inlet port and an inlet chamber positioned orthogonally to the longitudinal flow axis, an outlet port and an outlet chamber also positioned orthogonally to the longitudinal flow axis, and is mounted on a vehicle comprises shutting off the vehicle. At least one used aftertreatment component is removed from an internal volume defined by the housing without removing the aftertreatment system from the vehicle. A serviced or new aftertreatment component is position within the internal volume of the aftertreatment housing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive exhaust aftertreatment assemblies and methods of operating exhaust aftertreatment assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1A:
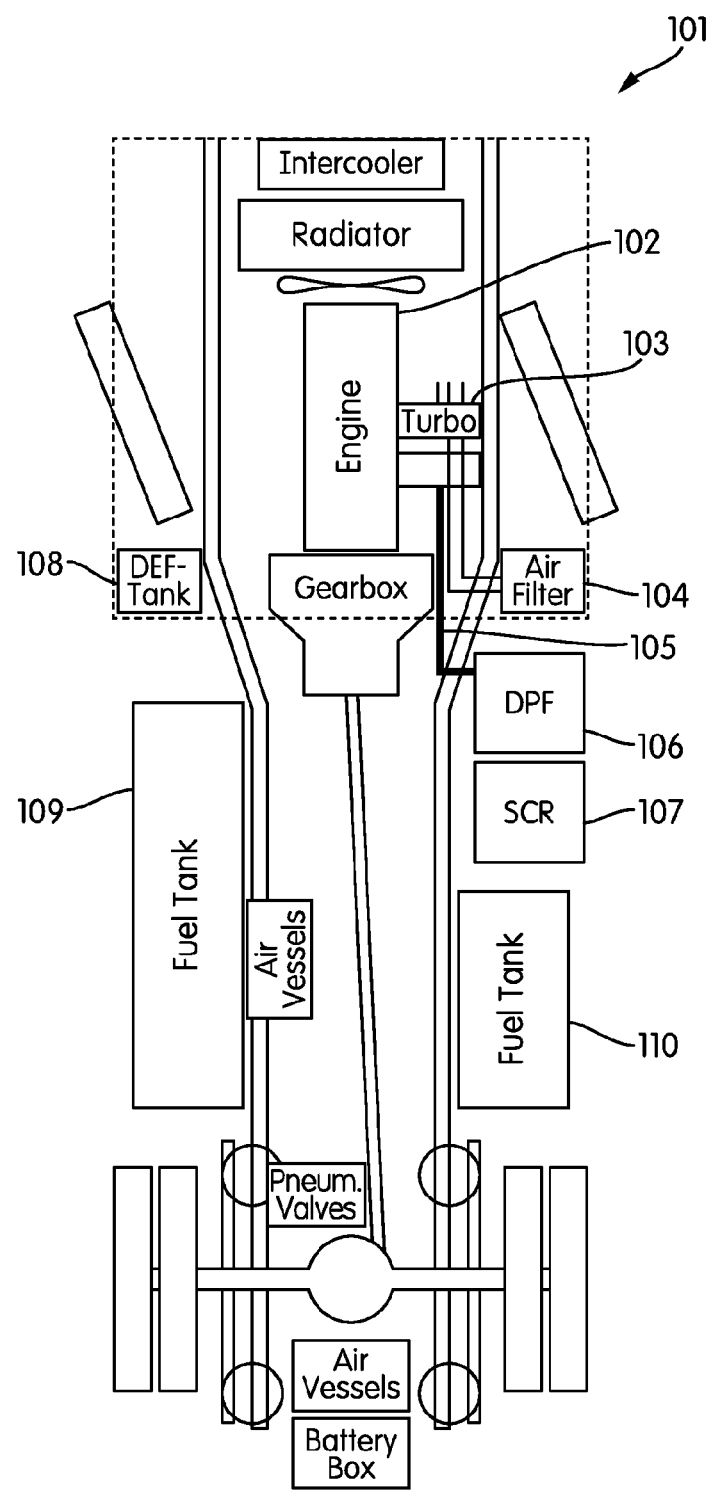
FIGS. 1A and 1B are schematic diagrams of exemplary trucks including exemplary exhaust aftertreatment assemblies.
Figure 1B:
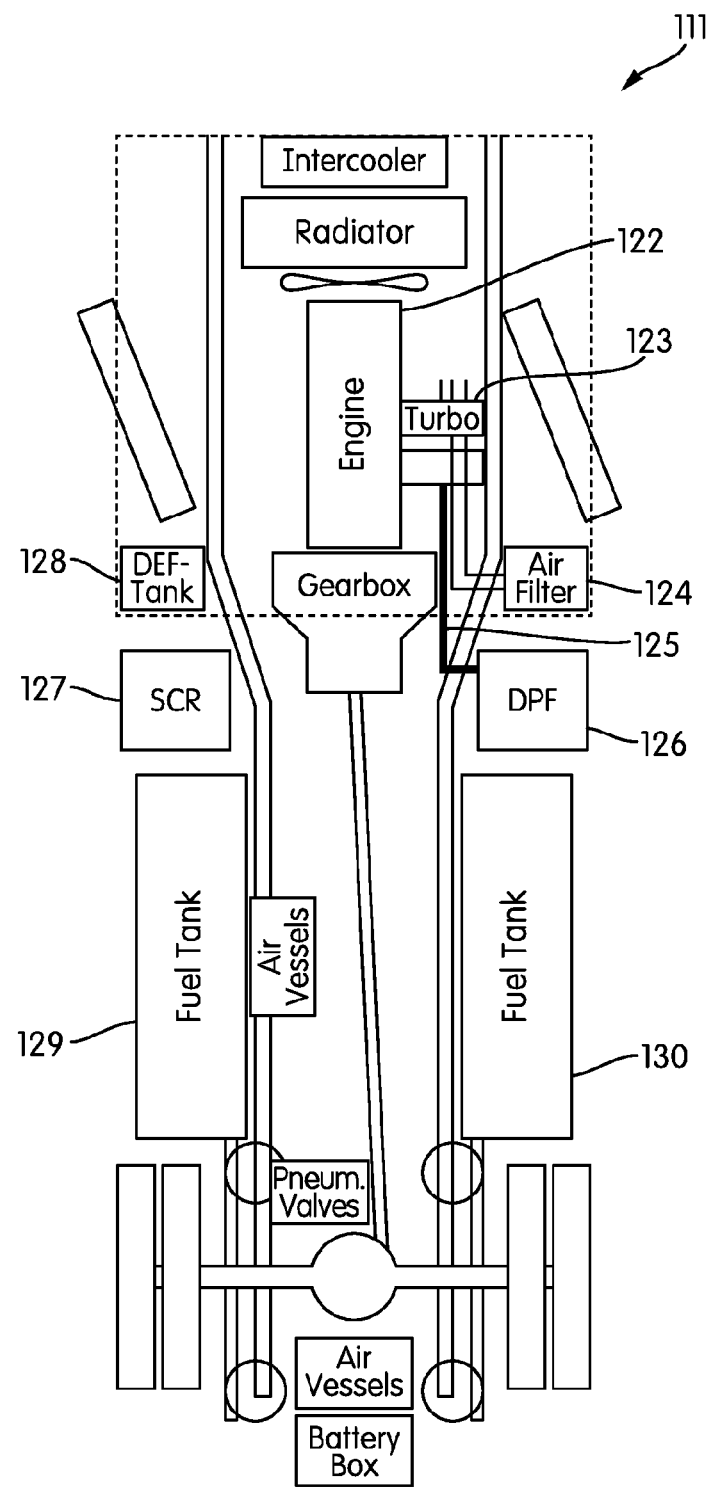

FIGS. 1A and 1B are schematic diagrams of exemplary exhaust aftertreatment assemblies on board vehicles. Vehicles, such as trucks 101 and 121 include diesel engines 102 and 122. The diesel engines 102 and 122 include turbo systems 103 and 123 coupled to the to the exhaust port of the diesel engines 102 and 122 respectively and coupled to air intake filters 104 and 124. The trucks 101 and 121 also include exhaust pipes 105 and 125 coupling aftertreatment exhaust system components to the engines 102 and 122.

The truck 101 includes an aftertreatment exhaust system including a diesel particulate filter (DPF) 106 and a selective catalytic reduction (SCR) component 107 fluidly coupled adjacent to one another. In contrast, the truck 121 includes a DPF) 126 and a SCR component 127 fluidly coupled, but positioned remote from one another on opposite sides of the truck 121. Trucks 101 and 121 also include diesel exhaust fluid (DEF) storage tanks 108 and 128. The truck 101 includes a first fuel tank 109 and a second fuel tank 110 positioned on opposite sides of the truck 101 and having different capacities. The truck 121 includes a first fuel tank 129 and a second fuel tank 130 positioned on opposite sides of the truck 121 and having the same capacities.

Figure 2:
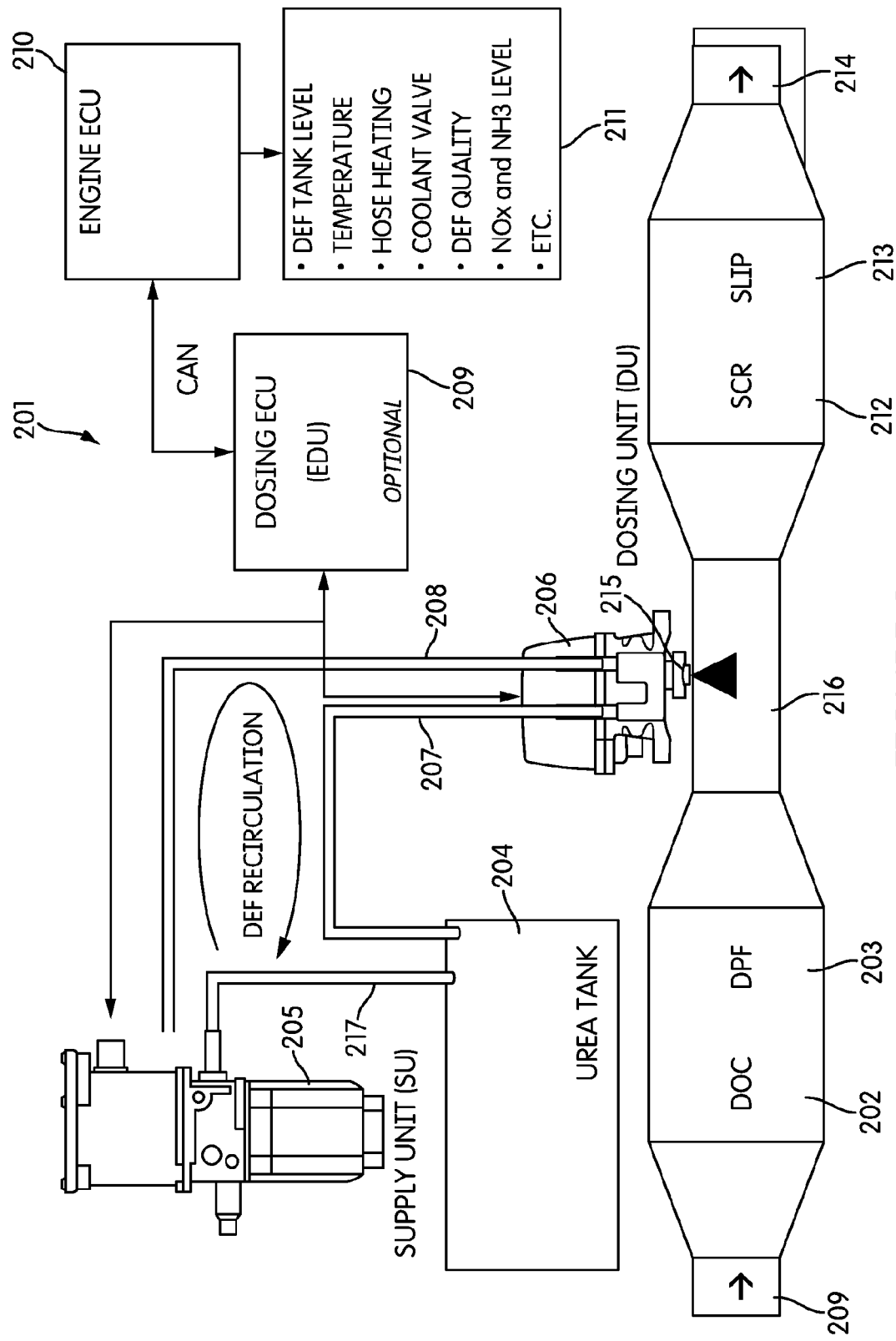
FIG. 2 is a schematic diagram of an exemplary exhaust aftertreatment assembly.

FIG. 2 is a schematic diagram of an exemplary exhaust aftertreatment assembly. An exhaust aftertreatment system 201 is coupled to an internal combustion engine, such as a diesel engine. The exhaust aftertreatment system 201 is coupled to the internal combustion engine via an exhaust conduit 209 fluidly coupled to an exhaust port of the internal combustion engine. As demonstrated in FIGS. 1A and 1B, the exhaust conduit 209 may be coupled to the internal combustion engine via a component such as turbo, which may be coupled to an exhaust manifold coupled to the exhaust ports of the engine. During operation, the internal combustion engine expels exhaust gas through the exhaust conduit 209 for transmission of the exhaust gas to the exhaust aftertreatment system 201. The exhaust aftertreatment system 201 is configured to remove various chemical and particulate emissions present in the exhaust gas.

The exhaust aftertreatment system 201 receives exhaust via the exhaust conduit 209. The exhaust received via the exhaust conduit 209 is transmitted to a diesel oxidation catalyst (DOC) component 202 which promotes chemical oxidation of components of the exhaust gas, such as carbon monoxide (CO) and hydrocarbons (HC). The exhaust gas is transmitted from the DOC component 202 to a DPF component 203 for filtration of diesel particulate therefrom. The exhaust aftertreatment system 201 generally includes a SCR component 212. The SCR component 212 is configured to reduce $NO_x$ into less harmful emissions, such as $N_2$ and $H_2O$, in the presence of ammonia ($NH_3$). Because ammonia is not a natural byproduct of the combustion process, it must be artificially introduced into the exhaust gas prior to the exhaust gas entering the SCR component 212. As described further herein, the ammonia is introduced via a dosing unit 206. The ammonia is introduced at the inlet face of the SCR component 212, flows through the SCR component 212, and is consumed in the $NO_x$ reduction process. Any unconsumed ammonia exiting the SCR component 212 (e.g., "ammonia slip") can be reduced to $N_2$ and other less harmful or less noxious components using an ammonia oxidation catalyst (AMOX) component 213.

The exhaust aftertreatment system 201 receives reductant, such as diesel exhaust fluid, for example urea or gaseous $NH_3$, from a reductant tank 204. The reductant is used to process and reduce the contaminants or other undesirable constituents in the exhaust flow received from the engine. The reductant from the reductant tank 204 is injected into the exhaust aftertreatment system 201 via the dosing unit 206, which includes an injection nozzle 215. The dosing unit 206 may include an air-assisted or airless unit. The dosing unit 206 is coupled to the reductant tank 204 via a reductant supply conduit 207. Flow into the reductant supply conduit 207 is caused by a supply unit 205. Flow from the dosing unit 206 for recirculation of urea from the dosing unit 206 is also controlled by the supply unit 205 and transferred via a reductant return conduit 208. The exhaust exiting the SCR component 212 and the AMOX component 213 exits the exhaust aftertreatment system 201 via an exhaust pipe 214 for transmission to a tailpipe or for recirculation in an exhaust gas recirculation (EGR) system.

Control of the release of the reductant from the reductant tank 204 to the dosing unit 206 is managed by a dosing electronic control unit 209, which may include one or more electrical controllers 210 and sensor modules 211 configured to actuate the supply unit 205 to provide the dosing unit 206 with the reductant from the reductant tank 204. The one or more electrical controllers 210 and the one or more sensor modules 211 determine a commanded reductant flow rate value or quantity. The commanded reductant flow rate value includes the amount of reductant determined warranted to treat the exhaust stream of exhaust presently in or headed to the exhaust aftertreatment system 201. The commanded reductant flow rate value may be determined based on conditions including, but not limited to, exhaust flow rate into the exhaust aftertreatment system, aftertreatment exhaust conditions, engine parameters such as rotational speed or torque, transmission gear, and or exhaust.

In certain embodiments, the dosing electronic control unit 209 includes a controller structured to perform certain operations to cause actuation of the supply unit 205 and cause urea from the reductant tank 204 to be transferred to the dosing unit 206 based on the instant exhaust flow conditions. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes sensor modules configured to determine a DEF tank level, a temperature level in a tank, component, or line, a NOx and NH₃ level, or another value associated with the exhaust stream or reductant.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 3A:
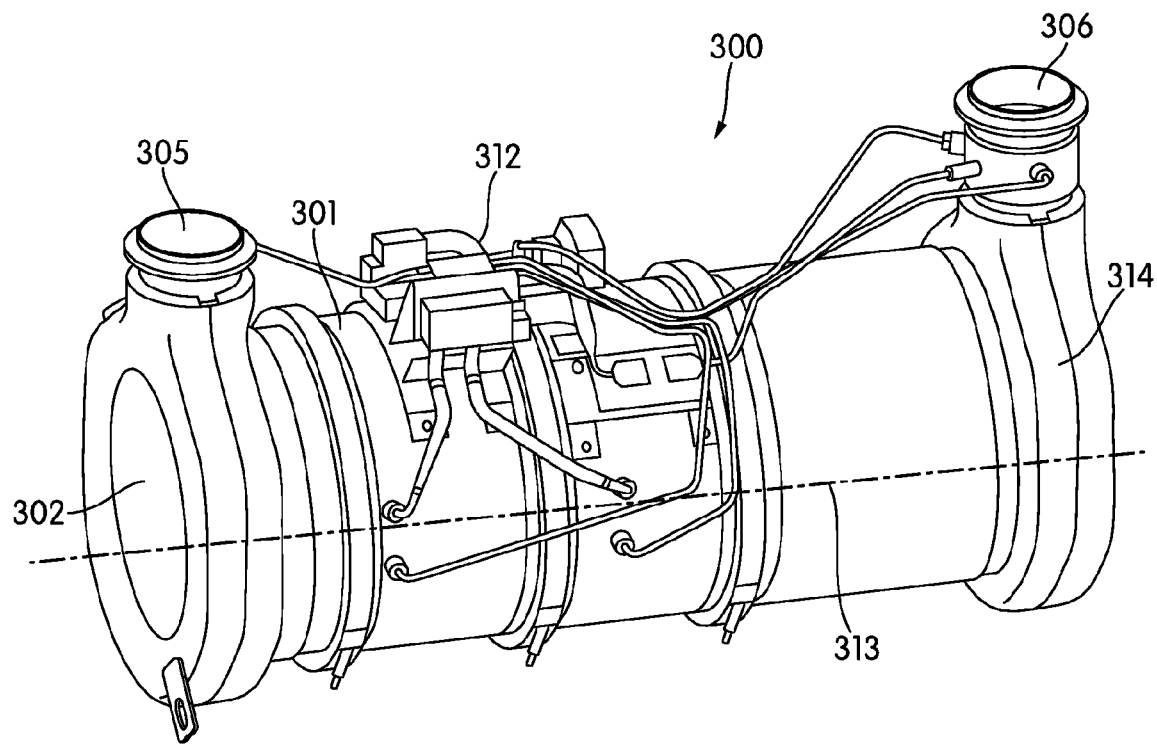
FIGS. 3A-3H are representations of an exhaust aftertreatment assembly, in accordance with example embodiments.
Figure 3B:
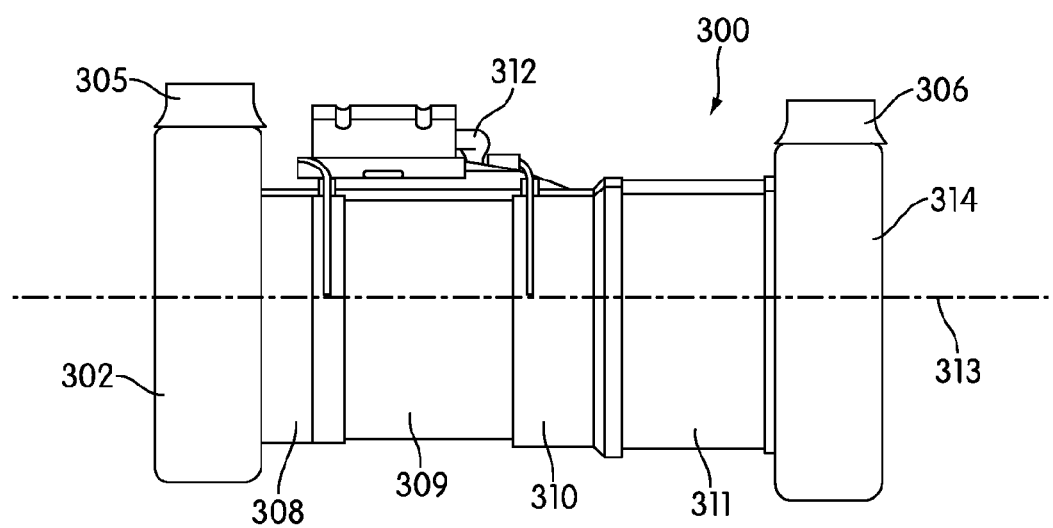
Figure 3C:
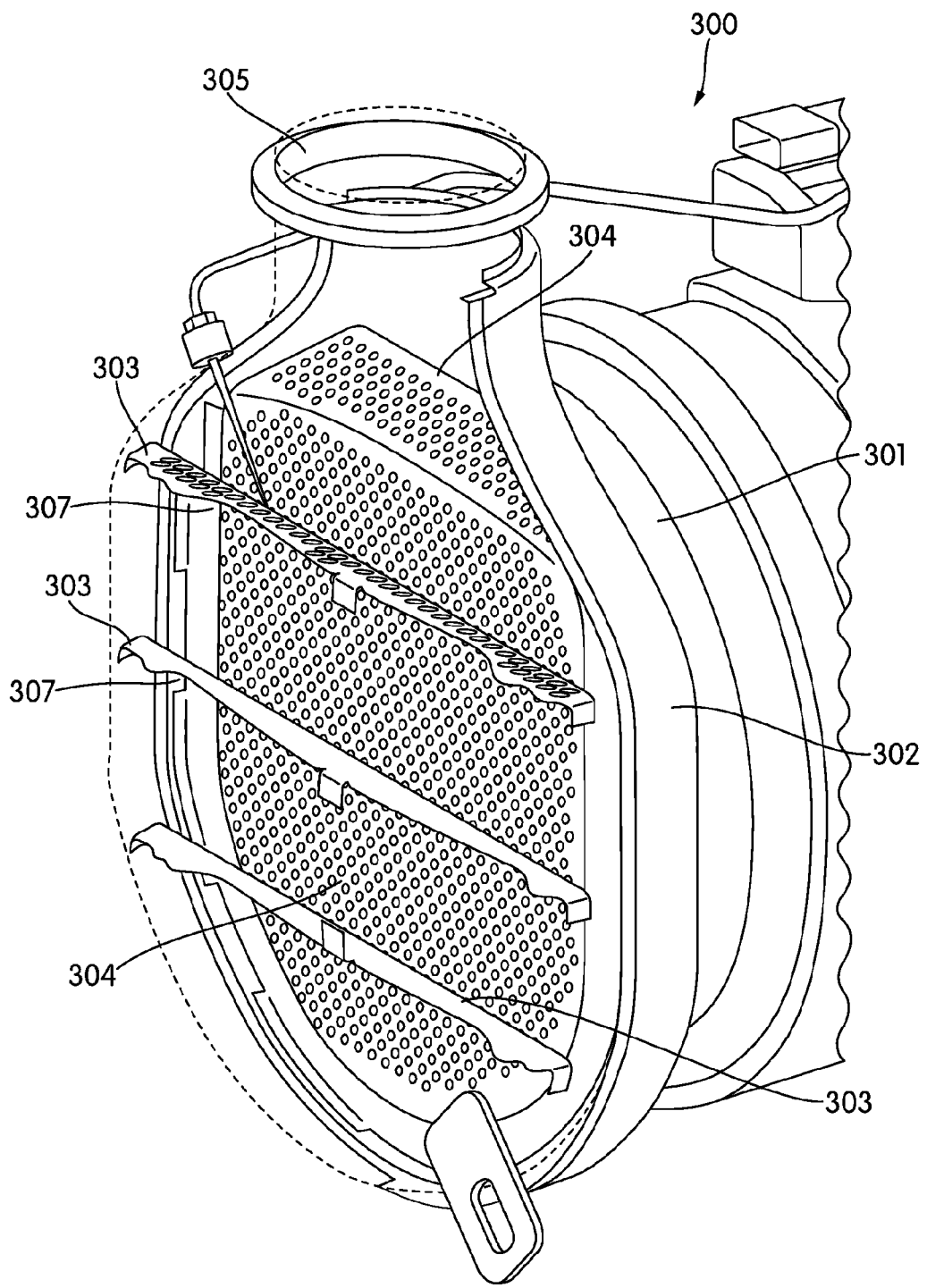
Figure 3D:
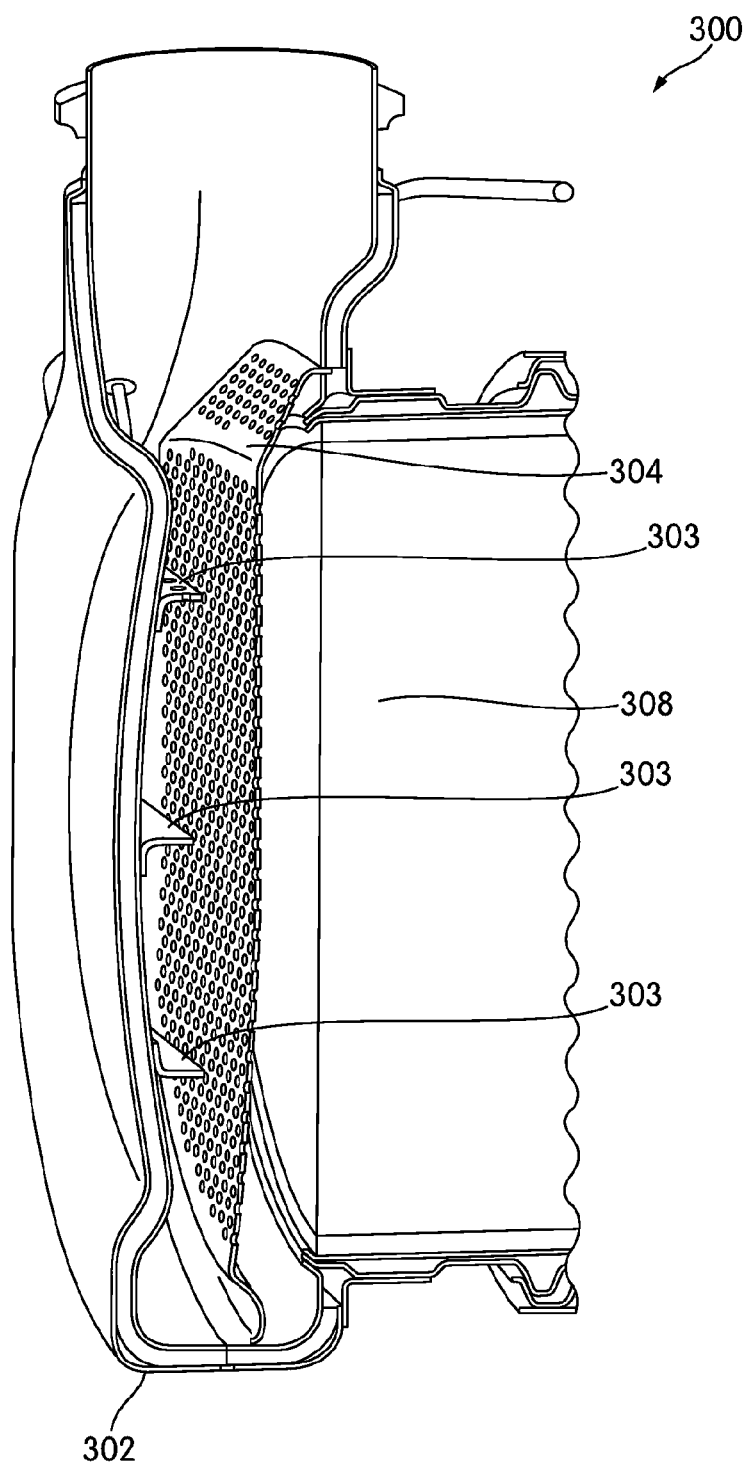

FIGS. 3A-3H are various representations of an exhaust aftertreatment assembly constructed in accordance with example embodiments. FIG. 3A shows a perspective view of an exhaust aftertreatment system 300. FIG. 3B is a side cross sectional view of the exhaust aftertreatment system 300. FIGS. 3C and 3D are partial views of the inlet region of the aftertreatment system 300. The exhaust aftertreatment system 300 includes an aftertreatment housing 301 including an inlet port 305 and an outlet port 306. The inlet port 305 may include a circular inlet opening. In example embodiments, all treated exhaust flow from the internal combustion engine of a vehicle flows through the exhaust aftertreatment system 300 via the inlet port 305 and the outlet port 306. Accordingly, in example embodiments the inlet port 305 is configured to receive exhaust flow from multiple exhaust pipes. The aftertreatment housing 301 is configured to house a plurality of exhaust aftertreatment components.

A high flow uniformity inlet chamber 302 or inlet chamber 302 is coupled to the aftertreatment housing 301 at the inlet port 305 so as to transfer exhaust gas into the aftertreatment housing 301 from an exhaust pipe coupled to an internal combustion engine. In example embodiments, the high flow uniformity inlet chamber 302 has a length that is less than 100 mm. The high flow uniformity inlet chamber 302 may include a circular entry opening and a rectangular outlet opening. The circular entry opening may be fluidly coupled to the inlet port 305. Furthermore, the rectangular outlet opening may be fluidly coupled to the outlet port 306.

The high flow uniformity inlet chamber 302 includes a plurality of flow redirection fins 303 configured to direct the flow entering via the inlet port 305 in a substantially orthogonal direction towards a baffle plate 304. A baffle plate 304 is positioned upstream of a DOC component 308 fluidly coupled to the high flow uniformity inlet conduit 302, and defines a plurality of apertures. The flow redirection fins 303 include flow through apertures 307 to permit the exhaust gas to extend laterally across the high flow uniformity inlet chamber 302. The cross-sectional area of the high flow uniformity inlet chamber 302 along a longitudinal flow axis 313 (e.g. substantially orthogonal to the baffle plate 304) is larger than the cross-sectional area of the DOC component 308 (i.e., the DOC component 308 may have a smaller cross-sectional area than an inlet chamber cross-sectional area of the inlet chamber 302). The high flow uniformity inlet chamber 302 having a cross sectional area that is larger than the cross sectional area of the DOC component 308 along the longitudinal flow axis 313 aids in directing the flow of exhaust gas to the entire catalyst face of the DOC component 308 while also minimizing the pressure drop of the exhaust gas flowing into the aftertreatment housing 301.

A particulate filter 309 or DPF 309 is fluidly coupled to the DOC component 308 downstream of the DOC component 308 such that the DOC component is positioned between the DPF 309 and the high flow uniformity inlet chamber 302. The DPF 309 filters particles from the oxidized exhaust gas exiting the DOC component 308. The DPF 309 is positioned along the corresponding longitudinal flow axis as the DOC component 308. In example embodiments, the DPF 309 is a serviceable diesel particulate filter section configured to be separately removed from the aftertreatment housing 301, for example without having to remove of the aftertreatment system 300 from a vehicle (e.g., the truck 101/111) to which it is attached.

A urea injection chamber 310 is fluidly coupled to the DPF 309 downstream of the DPF 309, such that that DPF 309 is positioned in the fluid path between the DOC component 308 and the urea injection chamber 310. In various embodiments, the DPF 309 may be a serviceable DPF section configured to be selectively removable from the exhaust aftertreatment assembly 300, for example to maintain or replace the DPF 309 (e.g., if the DPF 309 is clogged or broken). The urea injection chamber 310 includes a port for receiving an injector or injection nozzle of a dosing unit 312. The urea injection chamber 310 facilitates decomposition of the injected urea or other reductant into ammonia ($NH_3$) used for $NO_x$ reduction in the exhaust gas by an SCR component 311 positioned downstream of the urea injection chamber 310.

The SCR component 311 is positioned along the longitudinal flow axis 313 and is fluidly coupled to the urea injection chamber 310 to receive the exhaust gas and the ammonia created by the urea injection to catalyze reduction of $NO_x$ in the exhaust gas $N_2$ and $H_2O$. In example embodiments, the urea injection chamber 310 may be coupled to a plurality of SCR components 311.

Figure 3E:
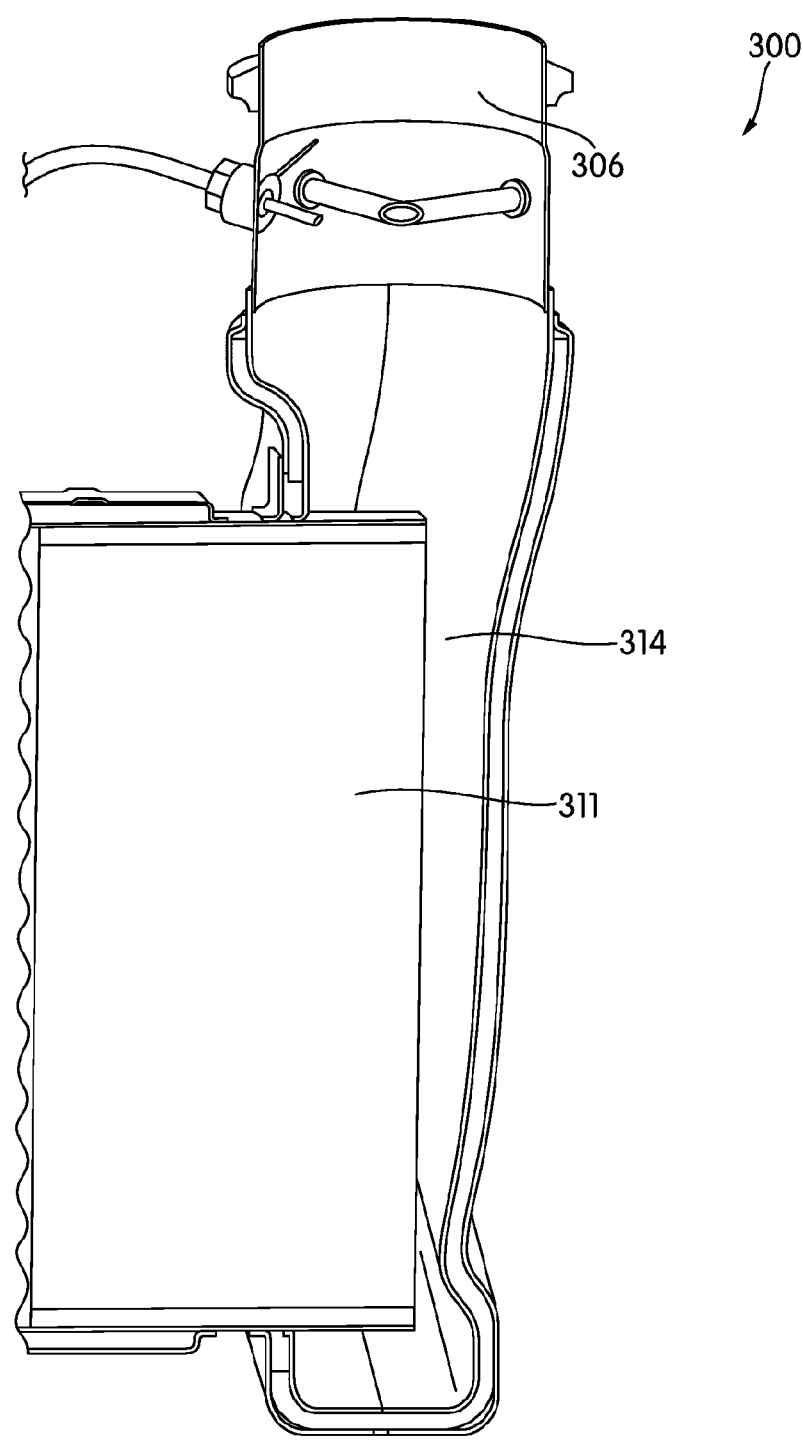

FIG. 3E is a partial and cross sectional view of the exhaust aftertreatment system 300. The exhaust aftertreatment component includes an outlet chamber 314 fluidly coupled to the SCR component 311 and including the outlet port 306. The outlet chamber 314 is configured to position the outlet port 306 in a direction corresponding to the inlet port 305. In example embodiments, the outlet chamber 314 may be fluidly coupled to the SCR component 311 downstream of an AMOX component (e.g., the AMOX component 213) and positioned downstream of the SCR component 311 in the aftertreatment housing 301. The AMOX component reduces ammonia slip by reducing excess ammonia in the exhaust to $N_2$ and other less harmful or less noxious components.

The AMOX component may be fluidly coupled to the outlet port 306 in the aftertreatment housing 301. The AMOX component is fluidly coupled to the outlet port 306 via an outlet chamber 314. In some embodiments, the DOC component 308 and the DPF 309 are positioned in a first flow channel along the longitudinal flow axis of the aftertreatment housing 301. Furthermore, the SCR component 311 and the AMOX component may be positioned in a second flow channel which is parallel to the first flow channel. The outlet port 306 is coupled to the outlet chamber 314 for transferring the treated exhaust to a tailpipe or an exhaust gas recirculation (EGR) system. The exhaust aftertreatment system 300 may also include a noise attenuation component for example a silencer coupled to and/positioned in the aftertreatment housing 301, whereby an auxiliary muffler may be eliminated.

Figure 3F:
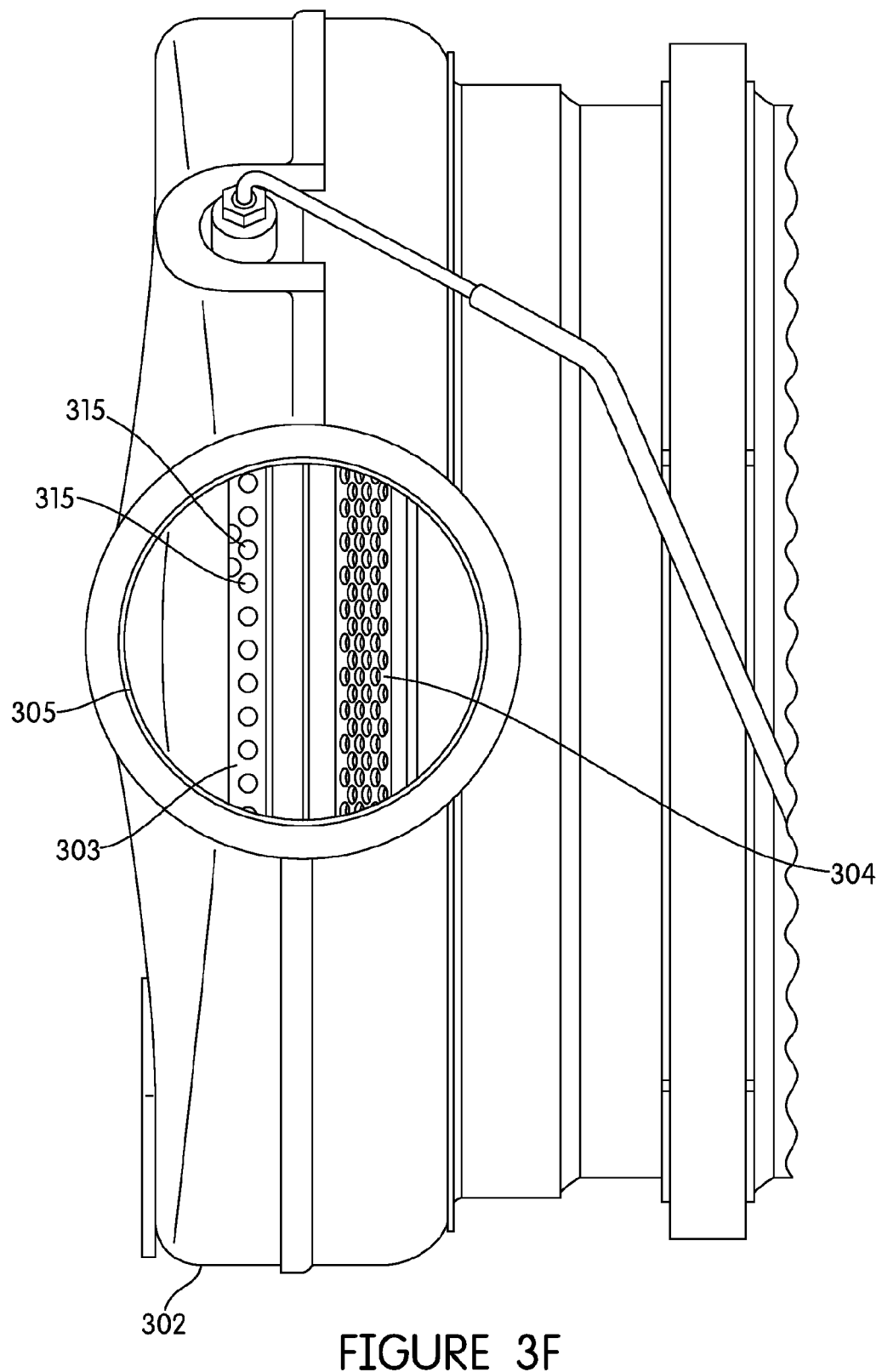

FIG. 3F is a side view of the high flow uniformity inlet chamber 302 of the exhaust aftertreatment system 300. The inlet port 305 is configured for coupling to an exhaust conduit extending directly or indirectly from a vehicle engine. The exhaust from the engine enters the exhaust aftertreatment system 300 via the inlet port 305 before being redirected toward the baffle plate 304 and the catalysts downstream of the baffle plate 304. Redirection of the flow is enhanced by the flow redirection fins 303. As demonstrated in FIG. 3, the flow redirection fins 303 are positioned substantially orthogonal the direction of an exhaust gas flow entering the inlet chamber 302 via inlet port 305. The flow redirection fins 303 include a plurality of flow openings 315 permitting at least some flow to traverse the flow redirection fins 303. In example embodiments, some of the flow redirection fins 303 include flow openings 315 while other flow redirection fins 303 do not. For example, the flow openings 315 may be defined in a portion of the flow direction fins positioned proximate to the inlet port 305.

Figure 3G:
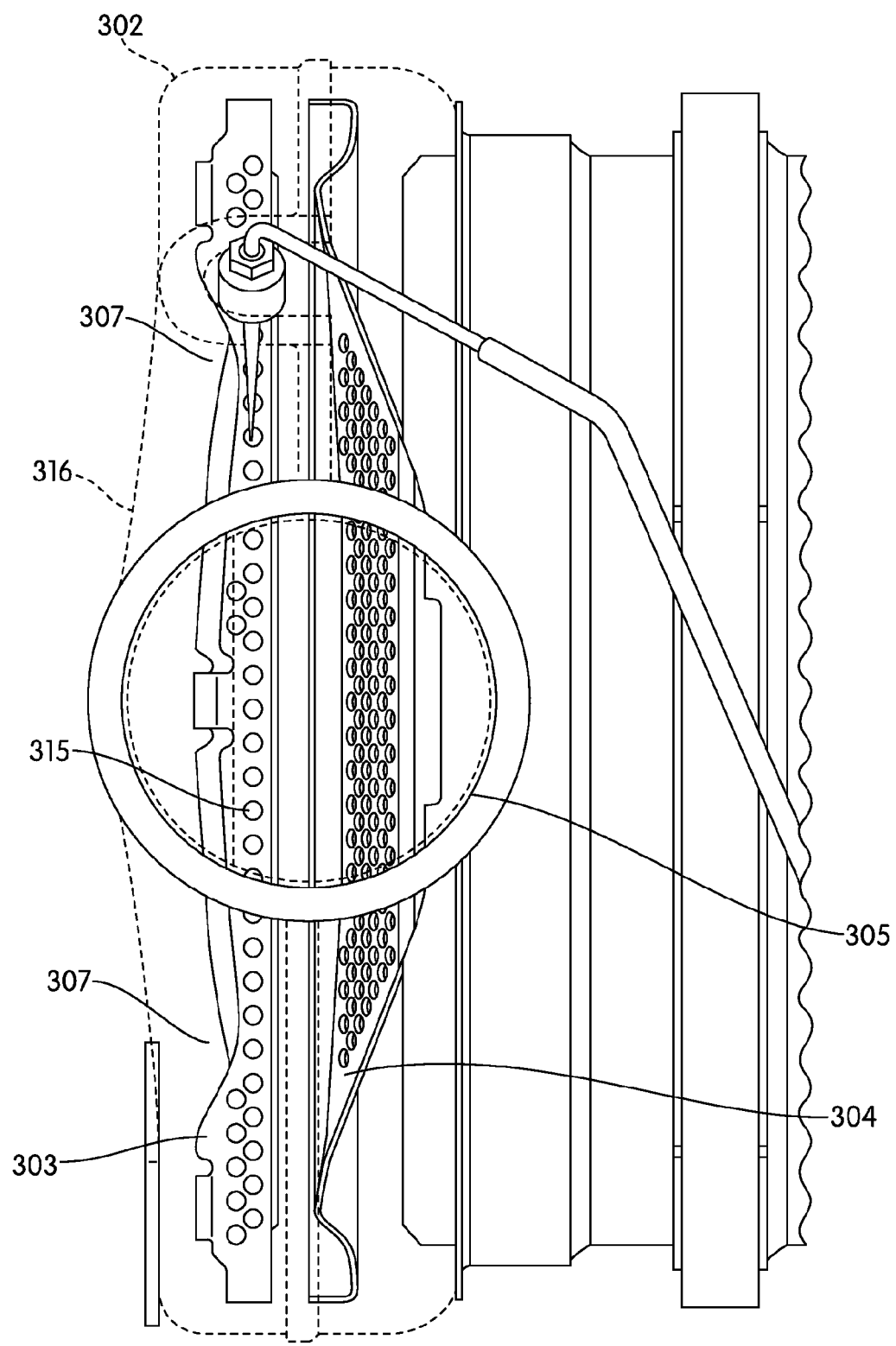

FIG. 3G is a side view of the high flow uniformity inlet chamber 302 showing the high flow uniformity inlet chamber 302 in a semi-transparent form. As shown in FIG. 3G, the flow redirection fins 303 define a flow through aperture 307 formed between the flow redirection fins 303 and a top surface 316 of the high flow uniformity inlet chamber 302. The flow through aperture 307 permits the exhaust gas flow entering the high flow uniformity inlet chamber 302 at the inlet port 305 to traverse across the entirety of the high flow uniformity inlet chamber 302, for example without flowing around the peripheral ends of the flow redirection fins 303. The flow redirection fins 303 include tabs 317 coupling the flow redirection fins 303 to the top surface 316 of the high flow uniformity inlet chamber 302. The tabs 317 may be coupled to the top surface 316 by one or more fasteners or may be chemically bonded to the top surface 316.

Figure 3H:
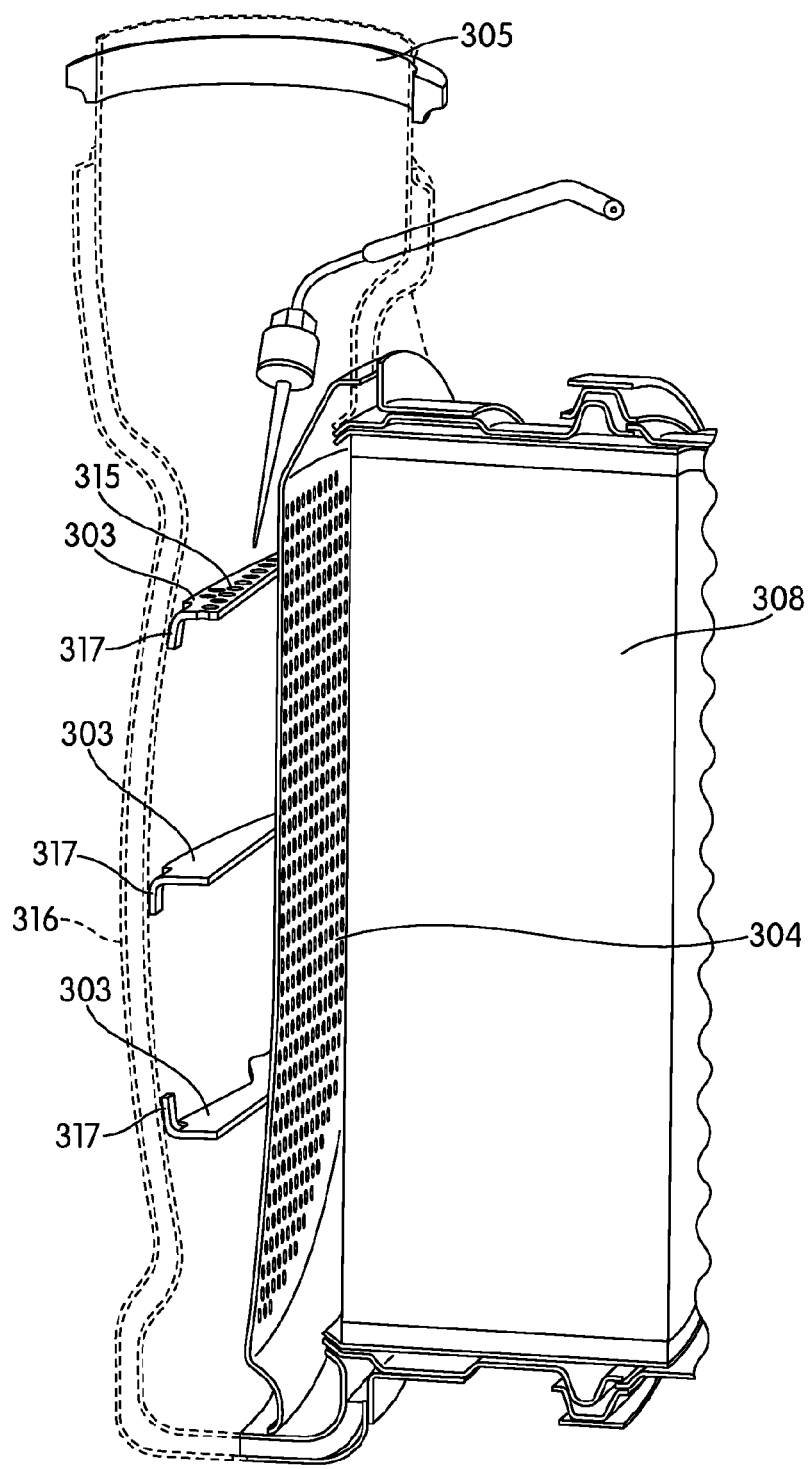

FIG. 3H is a cross sectional view of the high flow uniformity inlet chamber 302. As demonstrated in FIG. 3H, the flow redirection fin 303 closest to the inlet port 305 includes a plurality of the flow openings 315, while the other flow redirection fins 303 do not include the flow openings 315. The flow openings 315 may be structured to better facilitate uniform distribution of the exhaust gas flowing into the inlet chamber 302.

Figure 4:
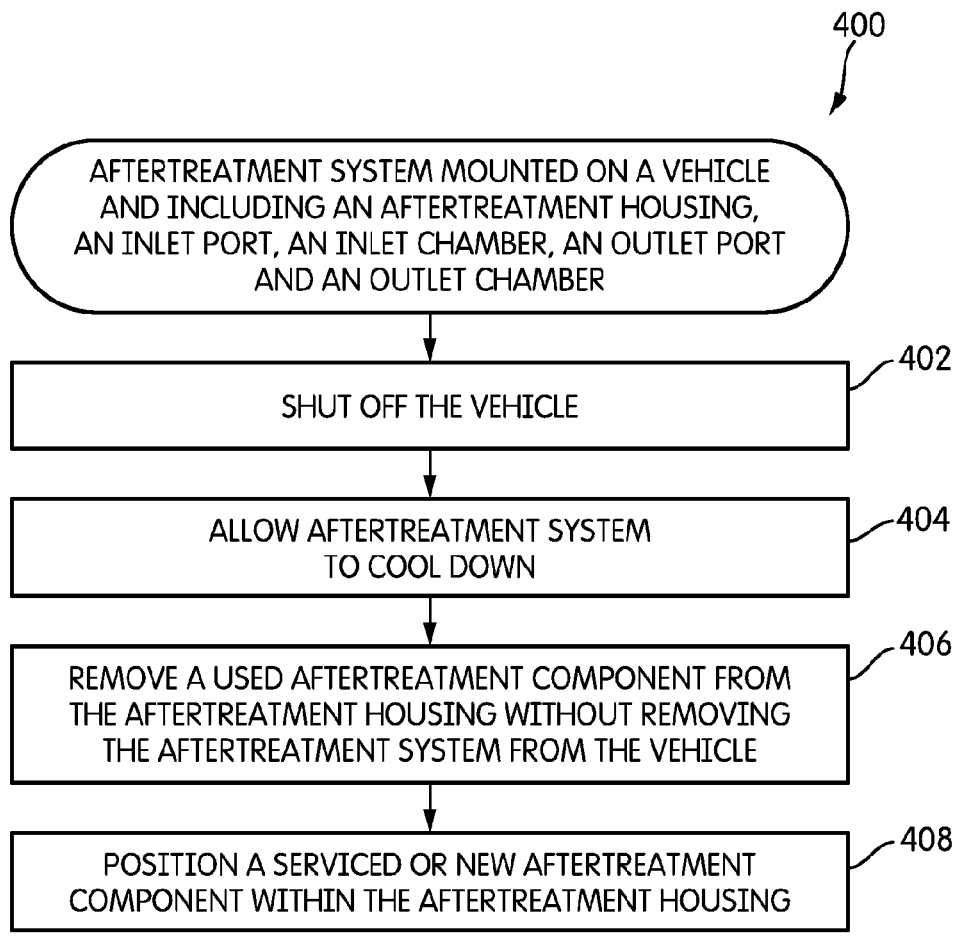
FIG. 4 is a schematic flow diagram of an embodiment of a method for servicing an aftertreatment system.

FIG. 4 is a schematic flow diagram of an example method 400 for servicing an aftertreatment system (e.g., the aftertreatment system 200/300 or any other aftertreatment system described herein). The aftertreatment system is mounted on a vehicle (e.g., the truck 101/121) and comprises an aftertreatment housing (e.g., the aftertreatment system housing 301) having a longitudinal flow axis, an inlet port (e.g., the inlet port 305) and an inlet chamber (e.g., the inlet chamber 302) positioned orthogonally to the longitudinal flow axis. Furthermore, the aftertreatment housing also includes an outlet port (e.g., the outlet port 306) and an outlet chamber (e.g., the outlet chamber 314) also positioned orthogonally to the longitudinal flow axis of the aftertreatment housing.

The method 400 comprises shutting off the vehicle at 402. For example, the truck 101 or 121 which includes the aftertreatment system 300 is shut off. The aftertreatment system is allowed to cool at 404. For example, the aftertreatment system 300 is allowed to cool, for example cooling to an ambient temperature, room temperature or a temperature sufficient to allow handling of the aftertreatment system (e.g., a temperature below 50 degrees Celsius).

At least one used aftertreatment component is removed from an internal volume defined by the aftertreatment housing without removing the aftertreatment system from the vehicle at 406. For example, the at least one used aftertreatment component can include a used particulate filter, for example the DPF 309 positioned in a first portion of the internal volume of the aftertreatment housing 301. The used particulate filter may be clogged with particulate matter and therefore has to be serviced or replaced with a new particulate filter. To change the used particulate filter, the particulate filter is removed from the first portion of the internal volume defined by the aftertreatment housing 301 without removing the aftertreatment system 300 from the vehicle. For example, the first portion the aftertreatment housing 301 can include a hinged door, a removable door, or a removable segment which can be uncoupled from the aftertreatment housing 301 to remove the particulate filter therefrom.

A serviced or new aftertreatment component is positioned within the aftertreatment housing at 408. For example, a serviced or new particulate filter is positioned within the first portion of the internal volume of the aftertreatment housing. In some embodiments, a SCR component, for example the SCR component 311 may be positioned in a second portion of the internal volume of the aftertreatment housing positioned downstream of the first portion of the internal volume of the aftertreatment housing 311.

The method 400 may further comprise removing SCR component 311 from the second portion of the internal volume of the aftertreatment housing 301 without removing the aftertreatment system from the vehicle. Furthermore, a serviced or new selective catalytic reduction component is positioned within the second portion of the internal volume of the aftertreatment housing.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An exhaust aftertreatment assembly, comprising:
an aftertreatment housing including an inlet port and an outlet port, the aftertreatment housing configured to house a plurality of exhaust aftertreatment components;
an inlet chamber coupled to the aftertreatment housing, the inlet chamber fluidly coupled to the inlet port of the aftertreatment housing so as to receive and redirect an exhaust gas flow from the inlet port, and the inlet chamber being defined by a sidewall that is located at a longitudinal end of the aftertreatment assembly so as to form an end face of a longitudinal flow path defined by the aftertreatment assembly;
a plurality of flow redirection fins extending from the sidewall of the inlet chamber into an internal volume defined by the inlet chamber, the plurality of flow redirection fins extending from the sidewall in a plane that is parallel to a longitudinal axis of the aftertreatment housing, the plurality of flow redirection fins configured to redirect the exhaust gas flow entering the inlet chamber from the inlet port to flow parallel to the longitudinal axis of the aftertreatment housing;
a diesel oxidation catalyst positioned in the aftertreatment housing, the diesel oxidation catalyst fluidly coupled to the inlet chamber, the diesel oxidation catalyst having a smaller cross sectional area than the inlet chamber about the longitudinal axis of the aftertreatment housing;
a particulate filter positioned in the aftertreatment housing, the particulate filter fluidly coupled to the diesel oxidation catalyst;
a reductant injection chamber positioned in the aftertreatment housing, the reductant injection chamber fluidly coupled to the diesel oxidation catalyst, the reductant injection chamber including a reductant port configured to receive a reductant injector; and
a selective catalytic reduction component positioned in the aftertreatment housing, the selective catalytic reduction component fluidly coupled to the reductant injection chamber, the selective catalytic reduction component fluidly coupled to the outlet port in the aftertreatment housing.

2. The exhaust aftertreatment assembly of claim 1, further comprising a baffle plate including a plurality of apertures, the baffle plate positioned between the plurality of flow redirection fins and the diesel oxidation catalyst.

3. The exhaust aftertreatment assembly of claim 1, further comprising an ammonia oxidation catalyst positioned in the aftertreatment housing, the ammonia oxidation catalyst fluidly coupling the selective catalytic reduction component to the outlet port in the aftertreatment housing.

4. The exhaust aftertreatment assembly of claim 1, wherein the inlet chamber includes a circular entry opening and a rectangular outlet opening, the circular entry opening in fluid communication with the inlet port of the aftertreatment housing.

5. The exhaust aftertreatment assembly of claim 4, wherein the rectangular outlet opening of the inlet chamber is connected to the aftertreatment housing orthogonal to the longitudinal axis.

6. The exhaust aftertreatment assembly of claim 3, wherein the diesel oxidation catalyst and the particular filter are positioned in a first flow channel along the longitudinal axis, and wherein the selective catalytic reduction component and the ammonia oxidation catalyst are in a second flow channel parallel to the first flow channel.

7. The exhaust aftertreatment assembly of claim 1, wherein the inlet chamber is less than 100 mm in length.

8. The exhaust aftertreatment assembly of claim 1, wherein the exhaust aftertreatment assembly is configured to receive all of the exhaust gas flow from a vehicle via the inlet port and to expel all of the exhaust gas flow via the outlet port.

9. The exhaust aftertreatment assembly of claim 1, wherein the particulate filter is a serviceable diesel particulate filter section configured to be separately removed from the exhaust aftertreatment assembly.

10. The exhaust aftertreatment assembly of claim 1, further comprising a noise attenuation component positioned in the aftertreatment housing.

11. An aftertreatment system, comprising:
  an aftertreatment housing including an inlet port and an outlet port, the aftertreatment housing defining a longitudinal axis, the inlet port and the outlet port oriented orthogonal to the longitudinal axis of the aftertreatment housing;
  an inlet chamber coupled to the aftertreatment housing, the inlet chamber fluidly coupled to the inlet port of the aftertreatment housing so as to receive and redirect an exhaust gas flow from the inlet port towards the aftertreatment housing along the longitudinal axis thereof, and the inlet chamber being defined by a sidewall that is located at a longitudinal end of the aftertreatment system so as to form an end face of a longitudinal flow path defined by the aftertreatment assembly;
  a plurality of flow redirection fins extending from the sidewall of the inlet chamber into an internal volume defined by the inlet chamber, the plurality of flow redirection fins extending from the sidewall in a plane that is parallel to the longitudinal axis of the aftertreatment housing, the plurality of flow redirection fins configured to redirect the exhaust gas flow entering the inlet chamber from the inlet port to flow parallel to the longitudinal axis of the aftertreatment housing;
  an outlet chamber coupled to the aftertreatment housing, the outlet chamber fluidly coupled to the outlet port of the aftertreatment housing so as to receive and redirect the exhaust gas flow from the aftertreatment housing in a direction orthogonal to the longitudinal axis of the aftertreatment housing towards the outlet port;
  a reductant injection chamber positioned in the aftertreatment housing the reductant injection chamber including a reductant port configured to receive a reductant injector; and
  a selective catalytic reduction component positioned in the aftertreatment housing downstream of the reductant injection chamber and fluidly coupled thereto, the selective catalytic reduction component fluidly coupled to the outlet port of the aftertreatment housing.

12. The aftertreatment system of claim 11, further comprising:
  a diesel oxidation catalyst positioned in the aftertreatment housing upstream of the reductant injection chamber and downstream of the inlet chamber and fluidly coupled thereto, the diesel oxidation catalyst having a smaller cross-sectional area than an inlet chamber cross-sectional area of the inlet chamber about the longitudinal axis of the aftertreatment housing.

13. The aftertreatment system of claim 12, further comprising:
  a particulate filter positioned in the aftertreatment housing downstream of the diesel oxidation catalyst and upstream of the reductant injection chamber, and fluidly coupled thereto.

14. The aftertreatment system of claim 13, further comprising:
  an ammonia oxidation catalyst positioned downstream of the selective catalytic reduction component and upstream of the outlet chamber, and fluidly coupled thereto.

15. The aftertreatment system of claim 11, wherein the plurality of flow redirection fins include flow through apertures structured to permit the exhaust gas flow entering the inlet chamber at the inlet port to traverse across the entirety of inlet chamber.

16. The aftertreatment system of claim 11, wherein the plurality of flow redirection fins include a plurality of tabs structured for coupling the plurality of flow redirection fins to a top surface of the inlet chamber.

17. The aftertreatment system of claim 11, wherein at least a portion of the plurality of flow redirection fins define a plurality of flow openings, the portion of the plurality of flow redirection fins positioned proximate to the inlet port.

18. The aftertreatment system of claim 11, wherein a baffle plate is fluidly coupled to the inlet chamber, the baffle plate defining a plurality of apertures and positioned downstream of the plurality of flow redirection fins.

19. An aftertreatment housing assembly for housing a plurality of aftertreatment components comprising at least a selective catalytic reduction component, a diesel oxidation catalyst, and a particulate filter, the aftertreatment housing assembly comprising:
  an aftertreatment housing including an inlet port and an outlet port, the aftertreatment housing defining a longitudinal axis, the inlet port and the outlet port oriented orthogonal to the longitudinal axis of the aftertreatment housing;
  an inlet chamber coupled to the aftertreatment housing, the inlet chamber fluidly coupled to the inlet port of the aftertreatment housing so as to receive and redirect an exhaust gas flow from the inlet port towards the aftertreatment housing along the longitudinal axis of the aftertreatment housing, and the inlet chamber being defined by a sidewall that is located at a longitudinal end of the aftertreatment housing assembly so as to form an end face of a longitudinal flow path defined by the aftertreatment assembly;
  an outlet chamber coupled to the aftertreatment housing, the outlet chamber fluidly coupled to the outlet port of the aftertreatment housing so as to receive and redirect the exhaust gas flow from the aftertreatment housing in a direction orthogonal to the longitudinal axis thereof towards the outlet port;
  a reductant injection chamber positioned in the aftertreatment housing, the reductant injection chamber including a reductant port configured to receive a reductant injector; and
  a plurality of flow redirection fins extending from the sidewall of the inlet chamber into an internal volume defined by the inlet chamber, the plurality of flow redirection fins extending from the sidewall in a plane that is parallel to the longitudinal axis of the aftertreatment housing, the plurality of flow redirection fins structured to redirect the exhaust gas flow entering the inlet chamber via the inlet port to flow parallel to the longitudinal axis of the aftertreatment housing, wherein the diesel oxidation catalyst and the particulate filter are positionable downstream of the inlet chamber and upstream of the reductant injection chamber, and the selective catalytic reduction component is positionable downstream of the reductant injection chamber and upstream of the outlet chamber.

20. The aftertreatment housing assembly of claim 19, wherein the plurality of flow redirection fins include flow through apertures structured to permit an exhaust gas entering the inlet chamber via the inlet port to traverse across the entirety of inlet chamber.

21. The aftertreatment housing assembly of claim 19, wherein the plurality of flow redirection fins include tabs structured for coupling the plurality of flow redirection fins to a top surface of the inlet chamber.

22. The aftertreatment housing assembly of claim 19, wherein at least a portion of the plurality of flow redirection fins include a plurality of flow openings, the portion of the plurality of flow redirection fins positioned proximate to the inlet port.

23. The aftertreatment housing assembly of claim 19, wherein a baffle plate is fluidly coupled to the inlet chamber, the baffle plate defining a plurality of apertures and positioned downstream of the plurality of flow redirection fins.

* * * * *